F. LAUHOFF.
COATED FLAKES.
APPLICATION FILED JAN. 18, 1907.

901,455.

Patented Oct. 20, 1908.

2 SHEETS—SHEET 1.

WITNESSES

INVENTOR
Frank Lauhoff
By Newell S. Wright
Attorney.

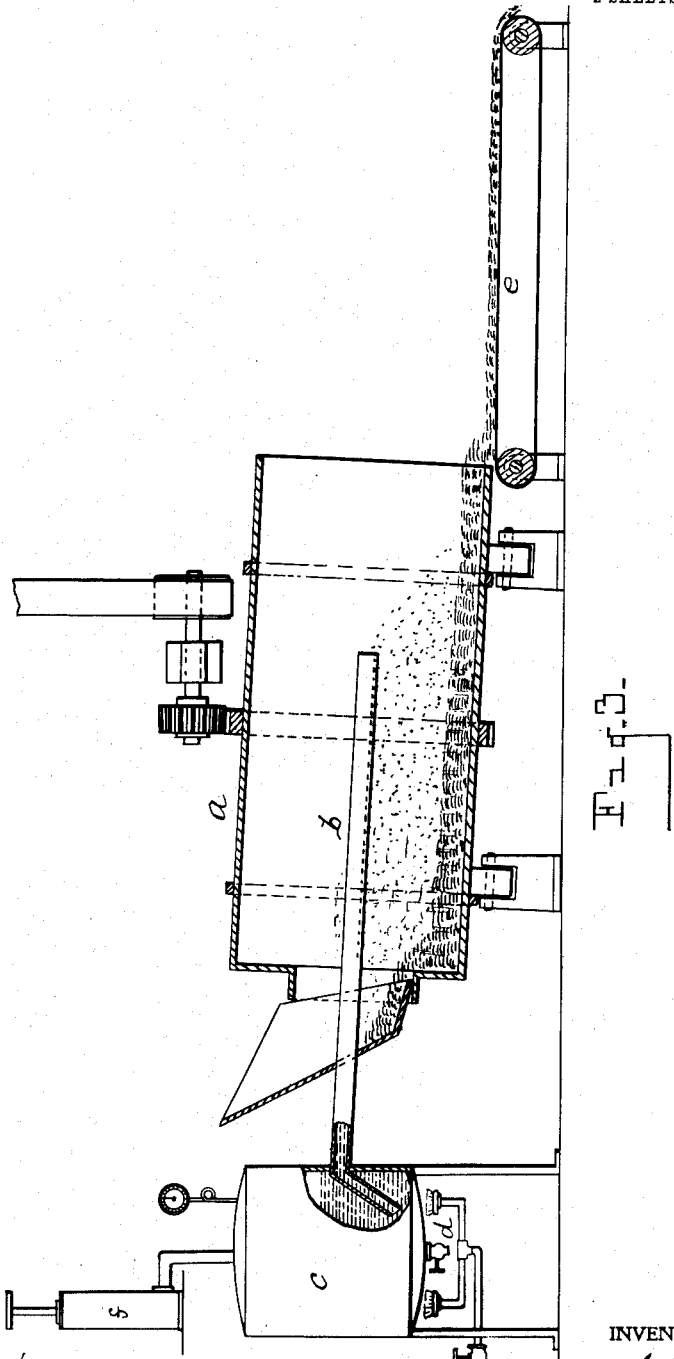

UNITED STATES PATENT OFFICE.

FRANK LAUHOFF, OF DETROIT, MICHIGAN.

COATED FLAKES.

No. 901,455. Specification of Letters Patent. Patented Oct. 20, 1908.

Application filed January 18, 1907. Serial No. 352,875.

*To all whom it may concern:*

Be it known that I, FRANK LAUHOFF, a citizen of the United States, residing at Detroit, in the county of Wayne and State of Michigan, have invented certain new and useful Improvements in Coated Flakes, of which the following is a specification.

My invention has for its object to provide coated cereal flakes as an article of manufacture, and the process of coating the flakes, wherein cereal flakes are coated exteriorly, after their formation, with a suitable substance without saturation or absorption of the coating material, the coating substance consisting of a liquid applied to the exterior surfaces of the flakes in the form of a mist or vapor, the liquid being very finely atomized by suitable means, the flakes still retaining their normally non-saturated condition.

The article of manufacture produced is designed more particularly to provide an improved and superior article of confection or food.

Figure 1:
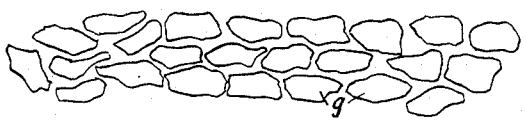
Figure 2:
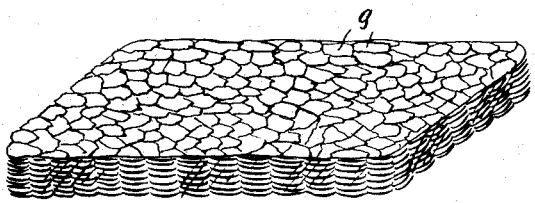

Figure 1 of the drawing submitted herewith shows a number of coated flakes. Fig. 2 shows a cake of compressed coated flakes. Fig. 3 shows a means of carrying out my invention, the mechanism being in vertical section and side elevation.

The flakes to be coated are preferably flakes made from cereal grits or granules subjected to a steaming process whereby the same are cooked, although I do not limit myself solely thereto, as I may within the scope of my invention employ cereal flakes embodied in the United States Letters Patent granted to me April 28, 1901, numbered 451,059, wherein rice flakes are formed of grits or granules drawn and compressed into films from the rice in its normally dry and raw condition. I do not, however, limit myself to any specific method of forming the films or flakes which are to be coated by my improved process.

My invention contemplates taking cereal films or flakes, after their formation in any desired manner, and uniformly coating their exterior surfaces only with a suitable liquid applied to their exterior surfaces, as above stated, in the form of a mist or vapor or very finely atomized spray. The flakes are agitated or stirred or set in rapid motion as a flocculent mass while the vapor or atomized spray is being applied thereto, the flakes being so rapidly agitated that the moisture of the vapor will not be absorbed or the flakes become impregnated or saturated thereby. The flakes to be coated, it should be understood, are very thin and readily dissolved, necessitating a process of treatment quite different from processes heretofore employed in the treatment of other more solid substances. It has heretofore been found impossible to exteriorly coat such flakes, inasmuch as should the flakes absorb the moisture or become impregnated or saturated therewith, the moisture applied thereto would cause them to be dissolved and reduced to the form of mush. The liquid applied may consist of melted sugar, a mixture of molasses and licorice, for example, or other analogous liquid substances, the coating substance consisting, preferably, of some sweetening material which may be flavored as desired and applied to the flakes, as above observed. The flakes so coated with a sweetening material form a delicious food or confectionery in themselves. My invention, however, contemplates, furthermore, as coming within its scope, very slightly compressing the coated flakes into packages or cakes or other bodies of desired form, as indicated in Fig. 2. The degree of compression required should be only sufficient to make the coated flakes adhere together so as to reduce the article of manufacture to a molded form. The resultant cake, it will be understood, is in the form of a porous flocculent mass, their reduction to a solid mass being preferably avoided.

When it is desired to press the flakes into a given form, they are preferably coated with a substance more or less adhesive. Various substances may be applied to the exterior surfaces of the flakes to coat the same and to make them adhere when compressed, within the scope of my invention.

Any suitable means may be employed for producing coated flakes as articles of manufacture, and to spray the coating liquid in the form of a mist or vapor upon the exterior surface of the flakes after their formation. Fig. 3 discloses a means for accomplishing my object, comprising a rotatable cylinder $a$, the cylinder being rotated in any desired manner and into which the flakes are fed. Into the cylinder projects a perforated pipe indicated at $b$ formed with suitable atomizing orifices preferably on the underside thereof, the perforated pipe constituting an atomizer for the coating liquid, the pipe communicating with a suitable reservoir or tank indicated at c containing the liquid employed, any suitable means, as indicated at d, being provided to heat the liquid, should it be required. The liquid is fed through the atomizing pipe, under a considerable pressure, as under a pneumatic pressure applied upon the contents of the reservoir or tank, so as to very finely atomize or vaporize the liquid as it is forced from the atomizing pipe upon the flakes. The flakes at the same time, as above observed, are set in rapid motion, and agitated as the cylinder is being revolved. The cylinder is also preferably elevated at a suitable incline so that the flakes when coated will work quickly to the discharge end thereof where they are preferably passed upon the carrier or belt indicated at e and permitted to dry, the operation of coating and discharging the flakes being rapidly conducted to prevent any absorption or saturation or impregnation of the flakes with the coating liquid. I have shown in the drawings an air pump whereby I secure a pneumatic pressure upon the contents of the liquid reservoir.

The flakes are indicated by the reference letter g.

My invention will now be understood.

What I claim as my invention is:

1. The herein described process of producing unsaturated, coated thin cereal films or flakes, consisting of spraying the exterior surfaces of thin cereal films or flakes with a finely atomized mist or vapor.

2. In the process of producing thin unsaturated coated cereal films or flakes, agitating the flakes as a flocculent mass, and simultaneously applying a coating substance upon the exterior surfaces of the flakes, the coating substance being applied to the exterior surfaces of the flakes in the form of a thin atomized mist or vapor.

3. The herein described process of treating thin cereal films or flakes consisting of agitating and moving forward the flakes as a flocculent mass, and simultaneously applying a finely atomized mist or vapor to the exterior surface of the flakes while the flakes are being agitated and moved forward, and then slightly compressing the coated flakes into desired form.

4. In the process of coating thin cereal films or flakes agitating and moving forward the flakes in a loose flocculent mass and simultaneously spraying the coating substance upon the exterior surfaces of the flakes, the coating substance being applied to the flakes in the form of a thinly atomized mist or vapor.

5. As an article of manufacture unsaturated exteriorly coated thin cereal films or flakes.

6. As an article of manufacture unsaturated thin cereal films or flakes having their exterior surfaces coated with a sweetening substance.

7. As an article of manufacture a mass or cake formed of unsaturated thin cereal films or flakes coated upon their exterior surfaces with an adherent substance.

In testimony whereof I affix my signature in presence of two witnesses.

FRANK LAUHOFF.

Witnesses:
N. S. WRIGHT,
E. M. SPIELBURG.